June 10, 1952  E. WILDHABER  2,599,596
UNIVERSAL JOINT
Filed Sept. 13, 1947  3 Sheets-Sheet 2

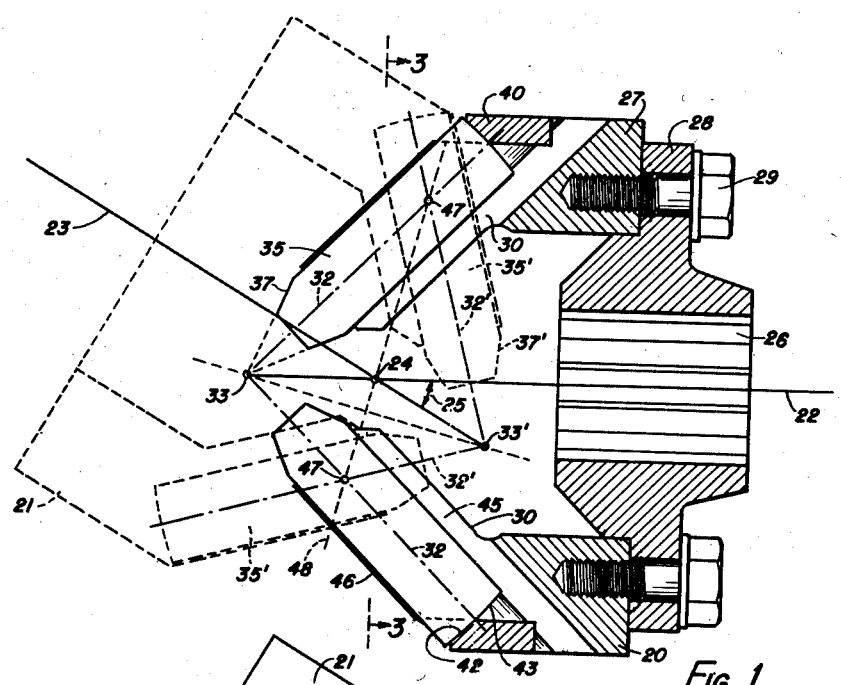

INVENTOR.
ERNEST WILDHABER
BY
*B. Schlesinger*
ATTORNEY

June 10, 1952     E. WILDHABER     2,599,596
UNIVERSAL JOINT
Filed Sept. 13, 1947     3 Sheets-Sheet 3
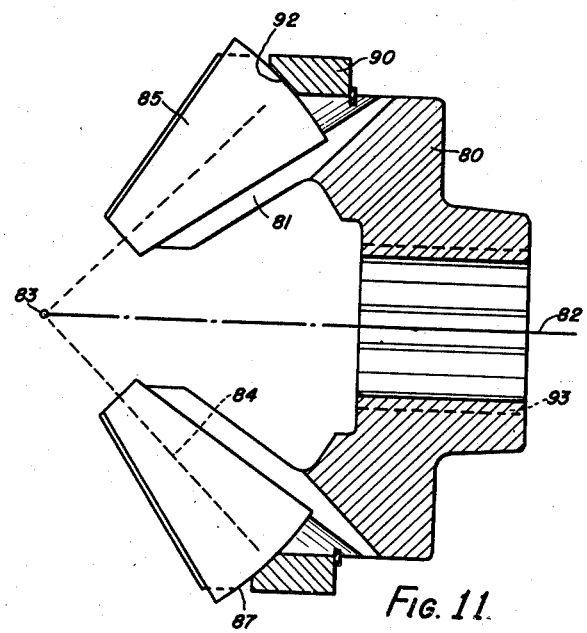
FIG. 11.
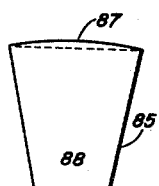
FIG. 12.
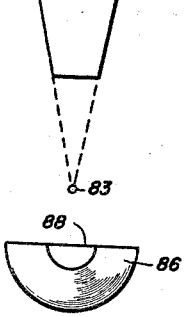
FIG. 13.
FIG. 14.
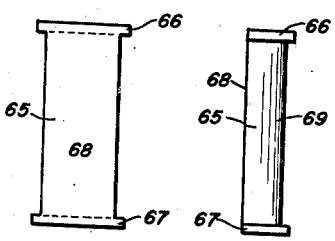
FIG. 15.
FIG. 16.
FIG. 17.
INVENTOR.
ERNEST WILDHABER
BY
ATTORNEY Patented June 10, 1952

2,599,596

UNITED STATES PATENT OFFICE 2,599,596

UNIVERSAL JOINT

Ernest Wildhaber, Brighton, N. Y.

Application September 13, 1947, Serial No. 773,816

11 Claims. (Cl. 64—21)

The present invention relates to universal joints and particularly to universal joints of the uniform motion type which are adapted to transmit motion at a constant velocity between intersecting, connected shafts regardless of the shaft angle and without change in blacklash when the shaft angle changes.

Conventional types of universal joints employ balls as the intermediate, torque-transmitting elements of the joint. These balls contact, at best, with line contact and have rolling and sliding action. The sliding action increases sharply with increased angularity of the shafts connected by the joint. If the shafts are inclined to one another at a large angle for long periods, then, the restricted contact of the balls and the consequently high contact pressures cause wear.

One object of the present invention is to provide a uniform motion type universal joint which is capable of carrying large loads and capable of high speeds because inertia loads are kept to a minimum.

Another object of the invention is to provide a joint of the character described which may be operated continuously with the two connected shafts disposed at a considerable angle to one another without appreciable wear.

Another object of the invention is to provide a universal joint in which the contact between the intermediate elements and the end members of the joint is improved so as to increase the load carrying capacity of the joint.

A further object of the invention is to provide a universal joint in which the intermediate elements contact with one another and with the end members of the joint with surface contact or a contact approaching surface contact so that they are therefore capable of carrying heavier loads and are less subject to wear.

A still further object of the invention is to devise a uniform motion type universal joint which will be simple in construction, which can be made easily and cheaply, and which will be more reliable than prior joints of this type.

Other objects of the invention will be apparent hereinafter from the specification and from the recital of the appended claims.

In the drawings:

Fig. 1 is a view showing in axial section one member of a universal joint constructed according to one embodiment of this invention, and showing in dotted lines the cooperating member of this joint;

Fig. 2 is a side elevation, looking in the same direction as Fig. 1, and showing the two members of the joint in engagement;

Fig. 11 is an axial sectional view of one member of a joint constructed according to a modification of the invention;

Figs. 12, 13 and 14 are a plan view, a side elevation and an end view, respectively, of one of the pins used in this modified form of joint; and Figs. 15, 16 and 17 are, respectively, a plan view, a side elevation, and an end view of a modified form of pin that may be used in the joint of Figs. 1 to 3 inclusive.

Figure 3:
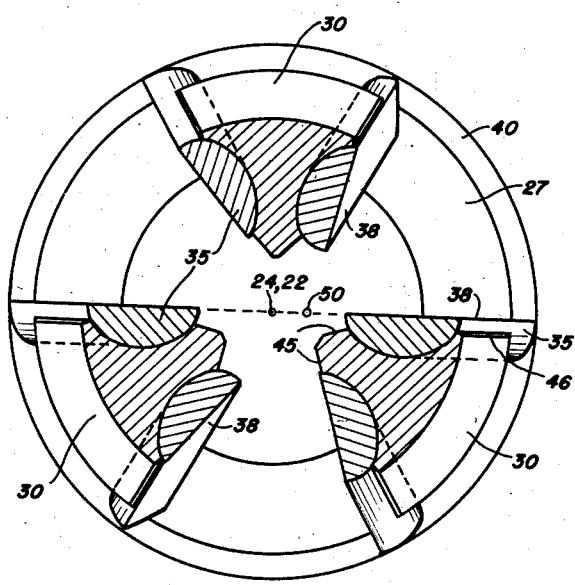
Fig. 3 is a section taken on the line 3—3 of Fig. 1 and looking in the direction of the arrows.
Figures 4, 5:
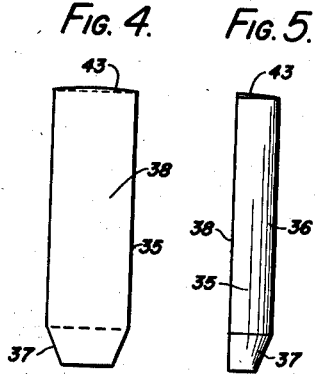
Fig. 4 is a plan view and Fig. 5 a side elevation of one of the intermediate elements or pins used in the joint of Figs. 1 to 3 inclusive.
Figure 6:
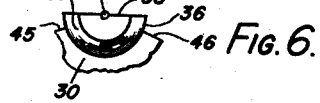
Fig. 6 is a fragmentary end view, looking at the inner end of one of the prongs of one of the end members of the joint of Figs. 1 and 2, and showing one of the pins or intermediate elements mounted thereon.

Reference will be had first to Figs. 1 to 6 inclusive. Here 20 and 21 denote, respectively, the two end members of a uniform motion type universal joint constructed according to one embodiment of this invention. These end members may be identical. They are rotatable on axes 22 and 23, respectively, which intersect in a point 24 and which include an angle 25 with one another. This angle may change, of course, in operation and corresponds to the angle between the axes of the two shafts that are connected by the joint. Each end member may be secured in any suitable way to its shaft, for instance by means of internal splines, such as denoted at 26 in Fig. 1, which fit external splines provided on the shaft.

Since the two end members are identical, one of them only need be described in detail. Corresponding parts of the other end member will be designated by corresponding reference numerals primed.

In the embodiment shown, each end member of the joint comprises two parts which are bolted together. The two parts of the end member 20 are designated 27 and 28, respectively, in Fig. 1 and are secured together by screws 29. The end member 20 has a plurality of inwardly inclined prongs 30 which converge toward one another. The opposite side faces of these prongs converge and are provided with arcuate grooves or sockets 31 whose axes 32 are inclined to axis 22 at an acute angle and intersect the axis 22 in a common point 33. The angle of inclination of the axes 32 to the axis 22 is preferably made larger than 30°, at least when the universal joint is designed to connect shafts which are to run at substantial shaft angularity. The surface of each groove or socket 31 is part of a cylindrical surface, less than half of it.

Into the grooves or sockets 31 fit the pins 35 which constitute the intermediate torque-transmitting members of the joint. These pins have semi-cylindrical surfaces 36 which extend for the greater portions of their lengths, and which seat in the grooves 31. The axes of these pins coincide with the axes 32 and intersect in the common point 33. Each has a plane side surface 38, and at its inner end has a semi-conical portion 37. The planes of surfaces 38 contain axes 32; and the surfaces 37 have their apices at 33.

Figure 10:
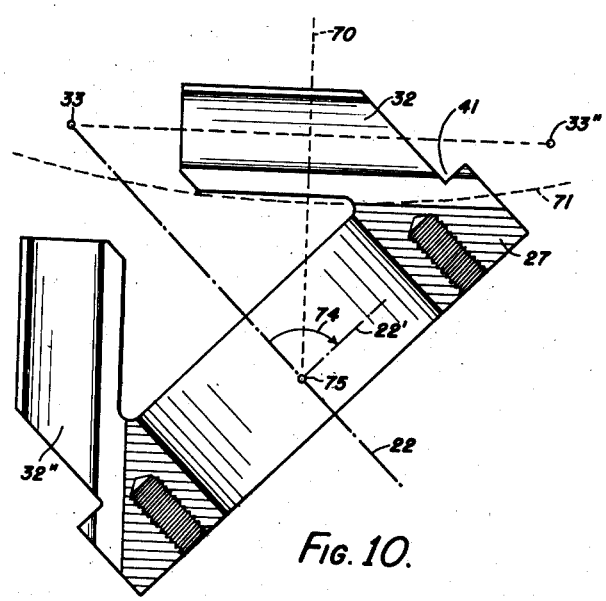
Fig. 10 is an axial sectional view of one of the end members of the joint and illustrating diagrammatically how the grooves may be cut in this end member to carry the intermediate elements or pins.

The pins 35 are held against outward axial displacement by means of a ring 40, which is secured in any suitable manner in a circular seat 41 (Fig. 10) in part 27. This ring has a spherical inside surface 42 against which the spherical end surfaces 43 of the pins seat. The center of the spherical surfaces 42 and 43 is at 33.

The pins are held against inward axial displacement by their conical ends 37. The conical ends of the two pins of a prong touch each other so that inward displacement is avoided. This is best illustrated in Fig. 2.

The pins are free to rock in their respective sockets within predetermined limits. The tops of the prongs 30 adjacent the sockets 31 are slanted plane surfaces 45 and 46, (Figs. 1 and 6) which coincide with the plane surfaces 38 of the pins at a little beyond the actual extreme turning position of the pins at the maximum shaft angle at which the joint is adapted to be used.

The axes 32' of the sockets of end member 21 intersect in point 33' lying on shaft 23. The axes 32 of end member 20 and axes 32' of end member 21 are equally spaced about their respective axes of rotation 22 and 23. They can be considered as lying in equally spaced axial planes of their respective end members.

The pins 35 and 35' of the two members form mating pairs which contact each other with their plane side surfaces 38 and 38'. As the joint revolves, each of the two contacting pins turns about its axis 32 or 32' in its socket 31 or 31' just enough so that its plane side surface 38 or 38' coincides with the plane of the two pin axes 32 and 32', respectively, so as to maintain this surface contact.

For reasons of symmetry, coordinated axes 32 and 32' intersect in points 47 which lie in a plane 48 (Fig. 1) that bisects the angle between the two axes 22 and 23 of rotation. This assures transmission of uniform motion.

The plane of a pair of axes 32 and 32' always intersects both point 33 and point 33'. It contains line 33—33'. In a plane section laid through intersection point 24 perpendicular to axis 22 of rotation, the straight profiles of the plane sides 38 of the pins always pass through a point 50 (Fig. 3) at which line 33—33' intersects this sectional plane.

In operation, as the angularly disposed connected shafts revolve, the pins 35 and 35' are forced to rock in their sockets by reason of the contact of their plane side surfaces 38 and 38' so that the planes of the faces of a pair of pins coincide. The amount of rocking motion depends upon the distance of point 50 from axis 22. For a given shaft angularity and diameter, this distance depends on the angle included between the pin axes 32 and the axis of rotation 22. It increases as this angle is reduced, because the distance between points 33 and 33' also is increased. The rocking motion of the pins is decreased, the larger said included angle. For this reason, the grooves 31 are preferably so made that the angle between axes 32 and 22 is, as stated, larger than 30°, unless the maximum shaft angularity is quite moderate.

One of the features of my universal joint is its self-centering capacity. The two axes 22 and 23 are centered, that is, made to intersect through the pin contact. With three or more prongs 30 or 30' on an end member, the three pairs of pins in driving contact give perfect centering. Where only two prongs are used, complete centering requires also help of the pins on the coast or non-driving sides of the prongs since at least three different points of contact are required for centering. For this reason I prefer to use, as illustrated, three prongs in joints constructed according to this invention.

A further feature of the joint of this invention is its capacity for axial displacement within given limits. In other words, the joint still operates perfectly despite displacement of the two end members and their shafts toward or away from one another.

In assembling the joint, the rings 40 and 40' are seated on their respective end members and the pins 35 and 35' are put into their respective arcuate sockets. Then the two end members are moved axially toward one another so that the plane sides 38 and 38' of the pins contact. This completes the assembly.

Figures 7, 8:
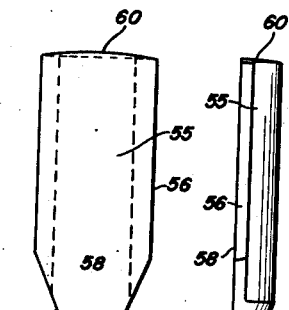
Figs. 7 and 8 are a plan view and a side view, respectively, of a modified form of pin or intermediate element which may be used in the joint of Figs. 1 to 3 inclusive.
Figure 9:
Fig. 9 is a fragmentary end view showing how this pin may be mounted in an end member of the joint.

Pins of a modified form are shown in Figs. 7 to 9 inclusive. These pins 55 have lateral flanges 56 extending beyond the cylindrical portions 57 of the pins so that the plane surfaces 58 of the pins are of increased width. In other respects, however, the pins are like the pins 35 described, being tapered at one end as indicated at 59 and having spherical outer surfaces as indicated at 60.

A further form of pin is illustrated in Figs. 15 to 17 inclusive. This pin 65 has flanges 66 and 67 at its ends for preventing axial displacement of the pin in the sockets. The pin has a semi-cylindrical surface 69 and a plane surface 68. The axis of the cylindrical surface 69 lies in the plane side 68.

The end members 20 and 21 may be made from forgings, castings, or from bar stock. In the latter case, the recesses between the prongs are broached or milled. Then the arcuate grooves or sockets 32 and the adjacent plane sides 45 and 46 may be simultaneously broached or milled with a formed broach or a formed milling cutter. A groove and the adjacent plane sides may, however, also be completed in a single turn of a milling cutter similar to the cutter of my U. S. Patent No. 2,267,181 which has a plurality of cutting blades arranged part-way around its periphery with a gap between the last and first blades. This cutter is fed across the face of the work in time with its rotation, so that it moves across the work and back in a revolution, and the work is indexed while the gap in the cutter is abreast of the work. The cutter axis in some cases can be set parallel to the plane containing axis 22 and axis 32 but if the projections at the inner ends of the prongs interfere with it, the cutter may be tilted. The cutter axis 70 (Fig. 10) is then inclined to the axial plane of the end member. 71 denotes the projected periphery of the cutter in the middle of its feed position. The process is continued until all of the slots at one side of the prongs have been cut. To cut the slots at the opposite side of the prongs, the work 27 is reset by turning it through an arc 74 about a pivot 75. Its axis 22 then assumes a position 22' and point 33 a position 33''. Groove 32'' is then presented to the cutter instead of groove 32. Thereafter, the grooves 32'' of the prongs are cut one at a time until all are completed. On two-pronged members, the work is turned in addition on its axis through 90°.

The grooves may be ground or lapped in similar manner and the term cutting as here used is understood to include grinding and lapping.

The grooves may also be cut with small or medium size cutters. In this case it is possible to mill or grind the grooves 32 and 32'' of opposite sides of the prongs simultaneously. As one cutter is fed along the groove at one side of a prong from the outside to the inside thereof, that is, from right to left in Fig. 10, the other cutter may be fed along the groove at the opposite side of the same prong from the inside to the outside thereof. In this way interference may be avoided even with medium size cutters. No turning about pivot 75 is then required for cutting grooves at opposite sides of the prongs. After the pair of grooves at opposite sides of a prong have been cut together with the adjacent plane sides of the prong, the work is merely indexed.

A further embodiment of the invention is illustrated in Figs. 11 to 14 inclusive. Here one end member 80 of a universal joint is shown which is provided with prongs 81 that have grooves or sockets therein which are conical surfaces and are adapted to receive tapered semi-conical pins 85. The axis 84 of each groove and of the pin, which is mounted therein, coincide and the axes 84 of the several grooves and pins intersect in a common point 83 which lies on the axis 82 of the end member. The pins have semiconical bottom surfaces 86 that seat in the grooves or sockets and plane upper surfaces 88 which contain the axes of the conical surfaces.

The pins are held against rearward axial displacement by a ring 90 which is secured in any suitable manner to the end member 80. This ring has a concave spherical surface 92 on its inside against which the end surfaces 87 of the pin members are adapted to abut and seat. The spherical surfaces of the ring and pins are centered at point 83. The pins are held against inward axial displacement toward point 83 by contact on their conical and plane sides, and no additional provision need be made for this purpose.

The end member 80 may be secured to its shaft by the internal splines 93 which engage external splines formed on the shaft.

It will be understood that while the invention has been described as embodied in joints for connecting two rotary shafts whose axes are more or less fixed at any one instant, it can also be used for connecting a rotary shaft to a part of which is stationary. The rotary part then performs a planetary motion about the stationary part.

It will further be understood that while the invention has been described in connection with certain specific embodiments thereof, it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint comprising two end members having grooves therein which are of circular arcuate cross-section and parts of conical surfaces, each groove having its large end further away from the axis of its end member than its small end, cooperating pairs of pins rockably mounted in the grooves of the two end members for transmitting torque between the end members, each of said pins being semi-conical in shape and having a plane surface contacting the plane surface of its mate and having its large end further away than its small end from the axis of its end member, and means for holding the pins against displacement outwardly of the axes of the end members.

2. A universal joint comprising two end members, each of which has a plurality of prongs that interfit with the prongs of the other member, each prong having grooves in its opposite side faces that are of circular arcuate cross-section and parts of surfaces of revolution whose axes intersect, the point of intersection of said axes being a common point for all the grooves of one member but different points for the grooves of the two members, cooperating pairs of pins rockably mounted in the grooves of the two members for transmitting torque between said members, each of said pins being of semi-circular cross-section and having a surface, which fits into a groove, which is a surface of revolution coaxial with the groove, each pin having a plane surface which contains the axis of said surface of revolution and which contacts the plane surface of the cooperating mate pin, the pins of each end member having spherical surfaces concentric with the point of intersection of the axes of the pins of that end member, and each end member having a ring secured to it, said ring having a concave spherical surface concentric with said point of intersection and against which the spherical surfaces of the pins seat for holding the pins in their grooves against outward axial movement.

3. A universal joint comprising two end members, each of said end members being provided with grooves which are open at both ends and which are parts of conical surfaces whose axes intersect the axis of the end member, cooperating contacting pairs of pins mounted in pairs of grooves of the end members for rocking movement about axes intersecting the axes of the respective end members, each of said pins being semi-conical in shape, and means for holding said pins against outward axial displacement in their grooves.

4. A universal joint comprising two end members, each of said end members being provided with grooves which are open at both ends and which are parts of surfaces of revolution of straight axial profile whose axes intersect the axis of the end member, cooperating contacting pairs of pins mounted in the pairs of grooves of the two end members for rocking movement about the axes of the grooves, each of said pins having a spherical end surface, and a ring-shaped part fastened to each end member and having a spherical surface centered on the axis of the end member against which the spherical surfaces of the pins abut.

5. A universal joint comprising two end members with interfitting prongs, each of the prongs of each end member being formed on opposite sides with a pair of grooves that are of arcuate profile and parts of surfaces of revolution whose axes intersect the axis of the respective end member, a pin rockably mounted in each groove and shaped to fit the groove, the two pins of each prong projecting inwardly toward the axis of the respective end member beyond the inner ends of their respective grooves to contact with each other and prevent inward axial displacement of the pins, and means for holding the pins against outward axial displacement, the pins at adjacent sides of the prongs of the two end members having cooperating contact.

6. A universal joint comprising two end members with interfitting prongs, each of the prongs of each end member being formed on opposite sides with a pair of grooves that are of arcuate profile and parts of cylindrical surfaces whose axes intersect the axis of the respective end member, a pin rockably mounted in each groove and shaped to fit the groove, the two pins of each prong projecting inwardly toward the axis of the respective end member beyond the inner ends of their respective grooves to contact with each other and prevent inward axial displacement of the pins, and means for holding the pins against outward axial displacement, the pins at adjacent sides of the prongs of the two end members having cooperating contact.

7. A universal joint comprising two end members with interfitting prongs, each of the prongs of each end member being formed on opposite sides with a pair of grooves that are parts of cylindrical surfaces whose axes intersect the axis of the respective end member, a pin rockably mounted in each groove and shaped to fit the groove, each pin having a tapered end projecting inwardly toward the axis of the respective end member beyond the inner end of its groove and the tapered ends of the two pins of each prong contacting with each other to prevent inward axial displacement of the pins, and means for holding the pins against outward axial displacement, the pins at adjacent sides of the prongs of the two end members having cooperating contact.

8. A universal joint comprising two end members with interfitting prongs, each of the prongs of each end member being formed on opposite sides with a pair of grooves that are parts of cylindrical surfaces whose axes intersect the axis of the respective end member, a pin rockably mounted in each groove and shaped to fit the groove, said pin having a conical end projecting inwardly toward the axis of the respective end member beyond the inner end of its groove, the conical ends of the pins mounted on opposite sides of each prong contacting to prevent inward axial displacement of the pins, the included cone angle of the contacting ends of each pair of pins being equal to the angle between the axes of the grooves at opposite sides of each prong, and means for holding the pins against outward axial displacement, the pins at adjacent sides of the prongs of the two end members having cooperating contact.

9. A universal joint comprising two end members with interfitting prongs, each of the prongs of each end member being formed on each of its opposite sides with a groove that is of arcuate profile and part of a surface of revolution whose axis intersects the axis of the respective end member, a pin rockably mounted in each groove, each pin of each end member having a plane surface and a surface which is part of a surface of revolution adapted to fit in a groove, each pin projecting inwardly toward the axis of its end member beyond the inner end of its groove and the two pins on opposite sides of each prong having their inwardly projecting ends contacting to prevent inward axial displacement of the pins, and means for holding the pins against outward axial displacement, the pins, which are mounted in adjacent sides of the prongs of the two end members, having their plane surfaces in contact to transmit torque between the end members.

10. A universal joint comprising two end members with interfitting prongs, each of the prongs of each end member being formed on each of its opposite sides with a groove that is of arcuate profile and part of a cylindrical surface whose axis intersects the axis of the respective end member, a pin rockably mounted in each groove, each pin having a plane surface and a surface which is part of a cylindrical surface whose axis lies in the plane surface and which is adapted to fit into a groove, each pin projecting inwardly toward the axis of its end member beyond the inner end of its groove and the two pins at opposite sides of each prong having their inwardly projecting ends contacting to prevent inward axial displacement of the pins, and means for holding the pins against outward axial displacement, the pins, which are mounted in adjacent sides of the prongs of the two end members, having their plane surfaces in contact to transmit torque between the end members.

11. A universal joint comprising two end members with interfitting prongs, each of the prongs of each end member being formed on its opposite sides with grooves that are of arcuate profile and parts of conical surfaces whose axes intersect the axis of the respective end member, a pin rockably mounted in each groove, each pin having a plane surface and a surface which is part of a conical surface whose axis lies in the plane surface and which is adapted to fit in a groove, each of said pins having a spherical end surface and a member secured to each member having a spherical surface complementary to the end surfaces of the pins and adapted to engage the end surfaces of all of the pins of said end member to hold said pins against outward axial displacement, the pins, which are mounted in adjacent sides of the prongs of the two end members, having their plane surfaces in contact to transmit torque between the end members.

ERNEST WILDHABER.

REFERENCES CITED

The following references are of record in the file of this patent:

UNITED STATES PATENTS

| Number | Name | Date |
| --- | --- | --- |
| 1,849,728 | Backmann | Mar. 15, 1932 |

FOREIGN PATENTS

| Number | Country | Date |
| --- | --- | --- |
| 12,697 | Great Britain | 1889 |